June 20, 1950 B. M. CRAIG ET AL 2,512,486
FORE-AND-AFT AERIAL CAMERA
Filed Sept. 26, 1944 7 Sheets-Sheet 4

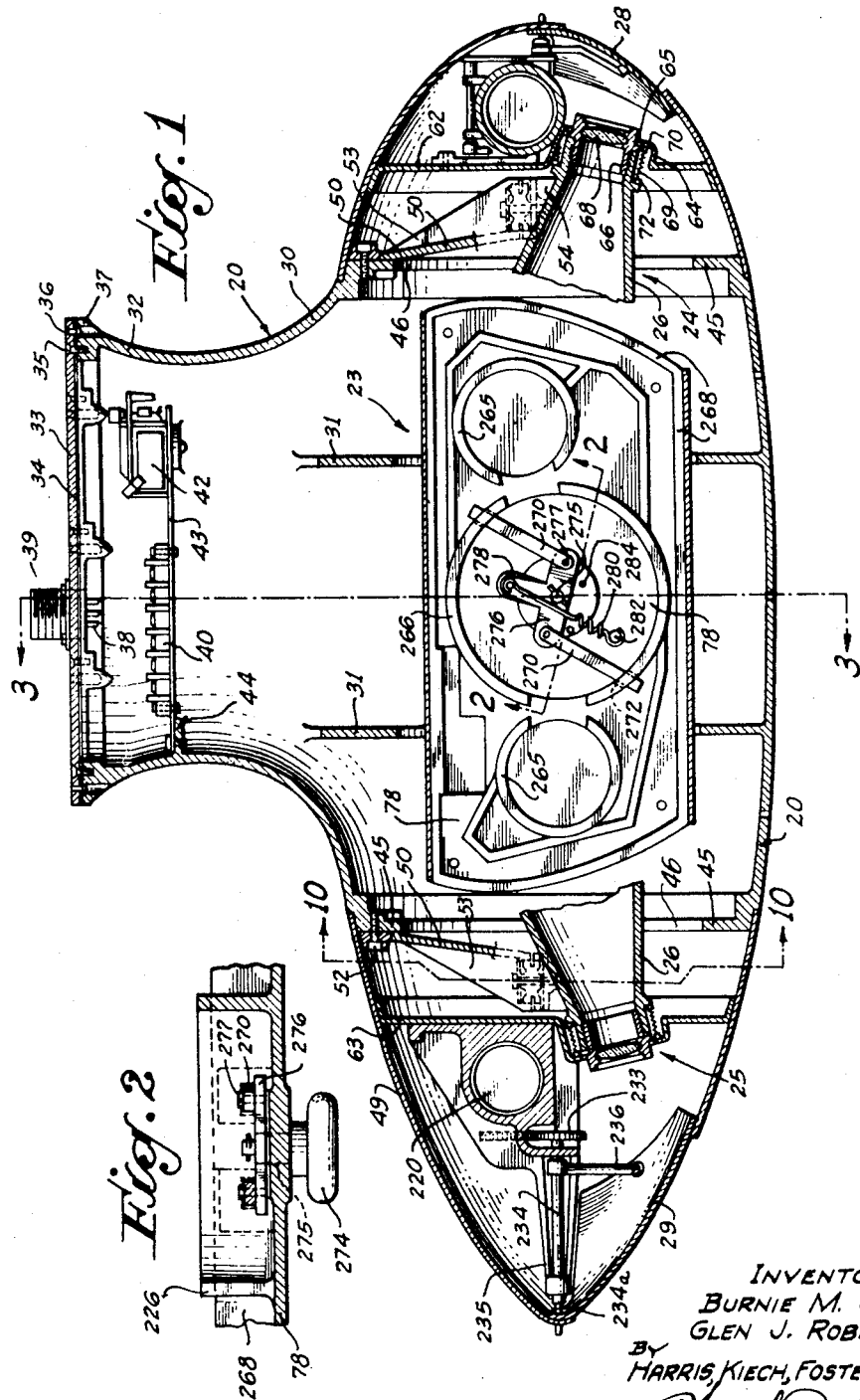
June 20, 1950     B. M. CRAIG ET AL     2,512,486
FORE-AND-AFT AERIAL CAMERA
Filed Sept. 26, 1944     7 Sheets-Sheet 1
INVENTORS
BURNIE M. CRAIG
GLEN J. ROBINSON
BY HARRIS, KIECH, FOSTER & HARRIS
FOR THE FIRM
ATTORNEYS June 20, 1950  B. M. CRAIG ET AL  2,512,486
FORE-AND-AFT AERIAL CAMERA
Filed Sept. 26, 1944  7 Sheets-Sheet 2
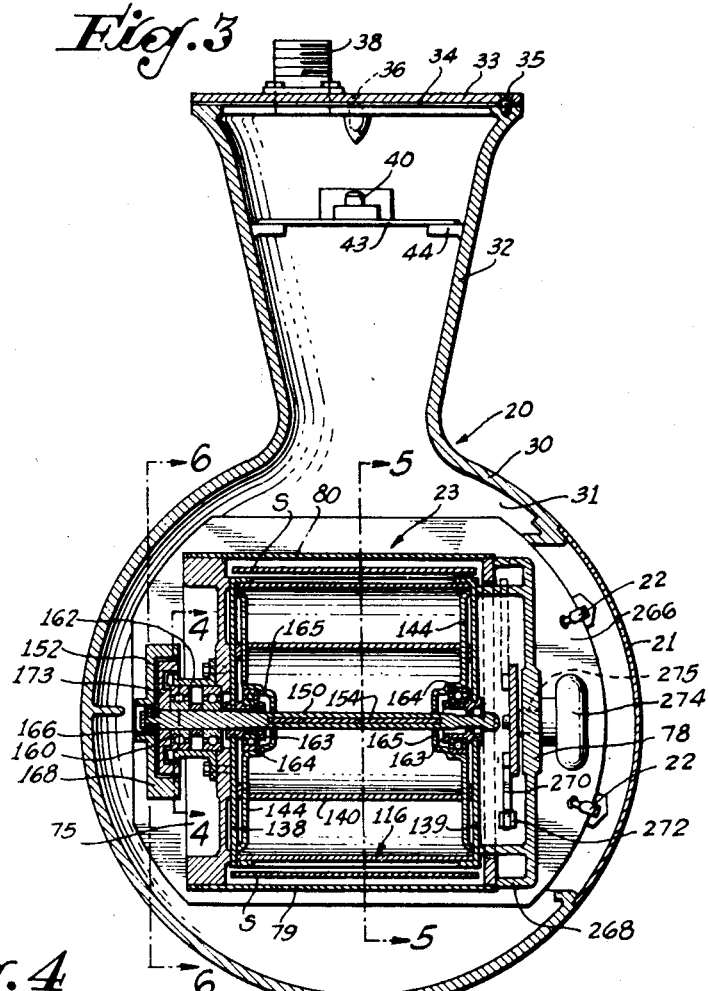
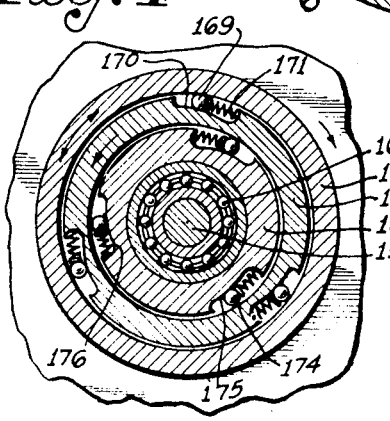
INVENTORS
BURNIE M. CRAIG
GLEN J. ROBINSON
BY
HARRIS, KIECH, FOSTER & HARRIS
FOR THE FIRM
ATTORNEYS

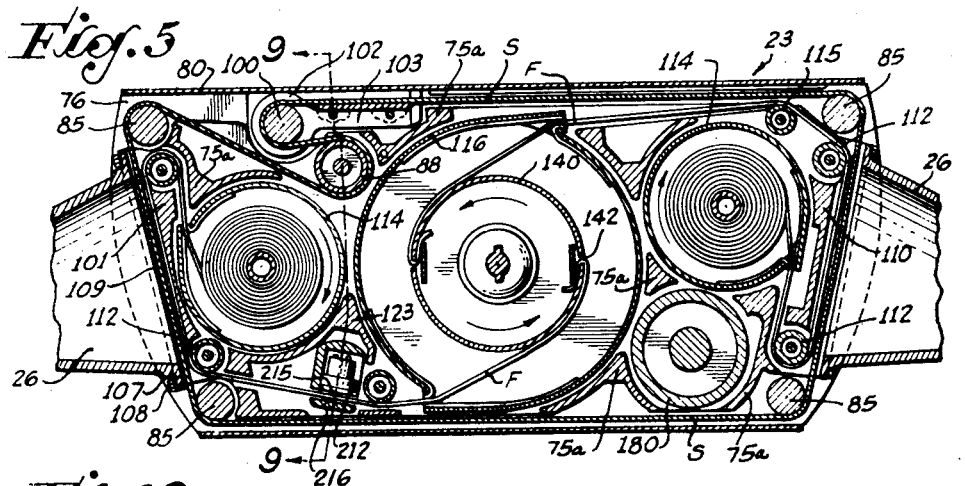
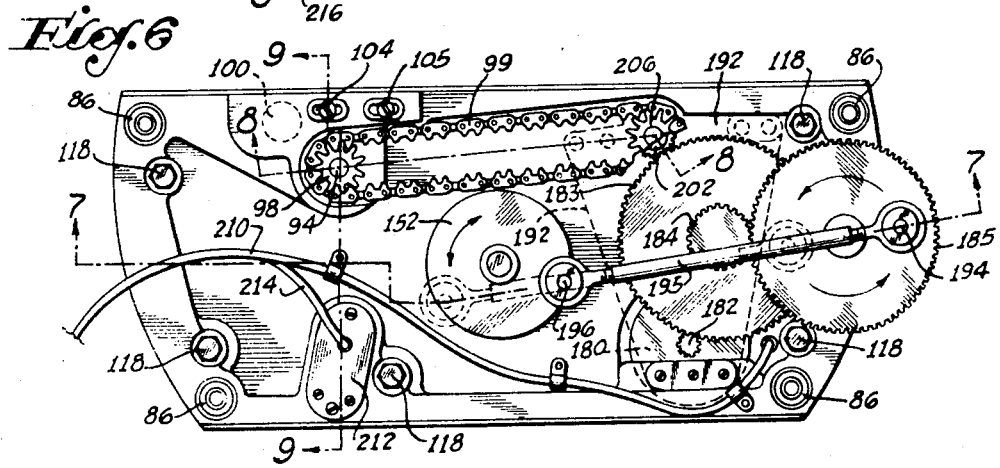
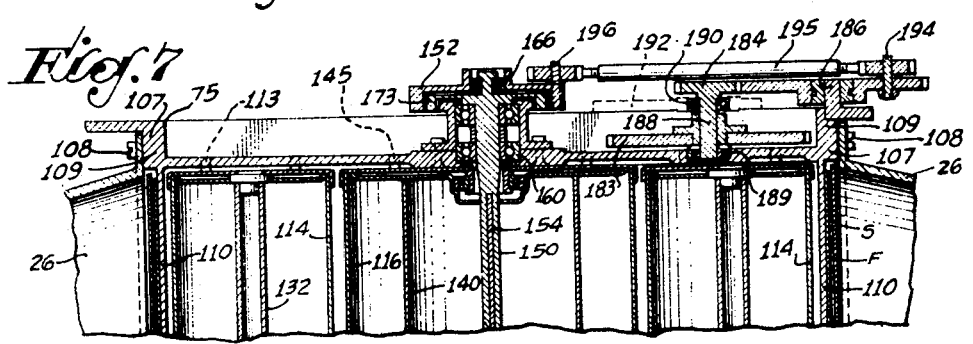
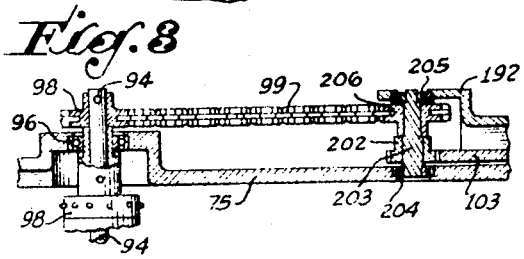

INVENTORS
BURNIE M. CRAIG
GLEN J. ROBINSON
BY
HARRIS, KIECH, FOSTER & HARRIS

FOR THE FIRM
ATTORNEYS

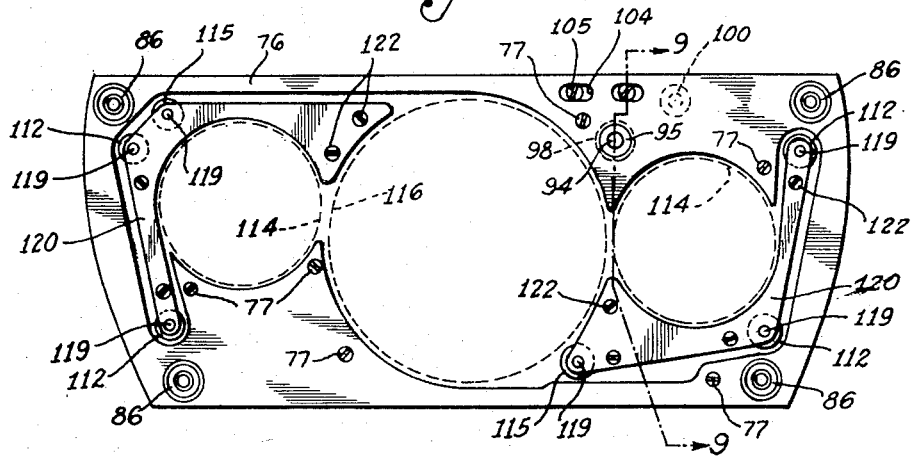

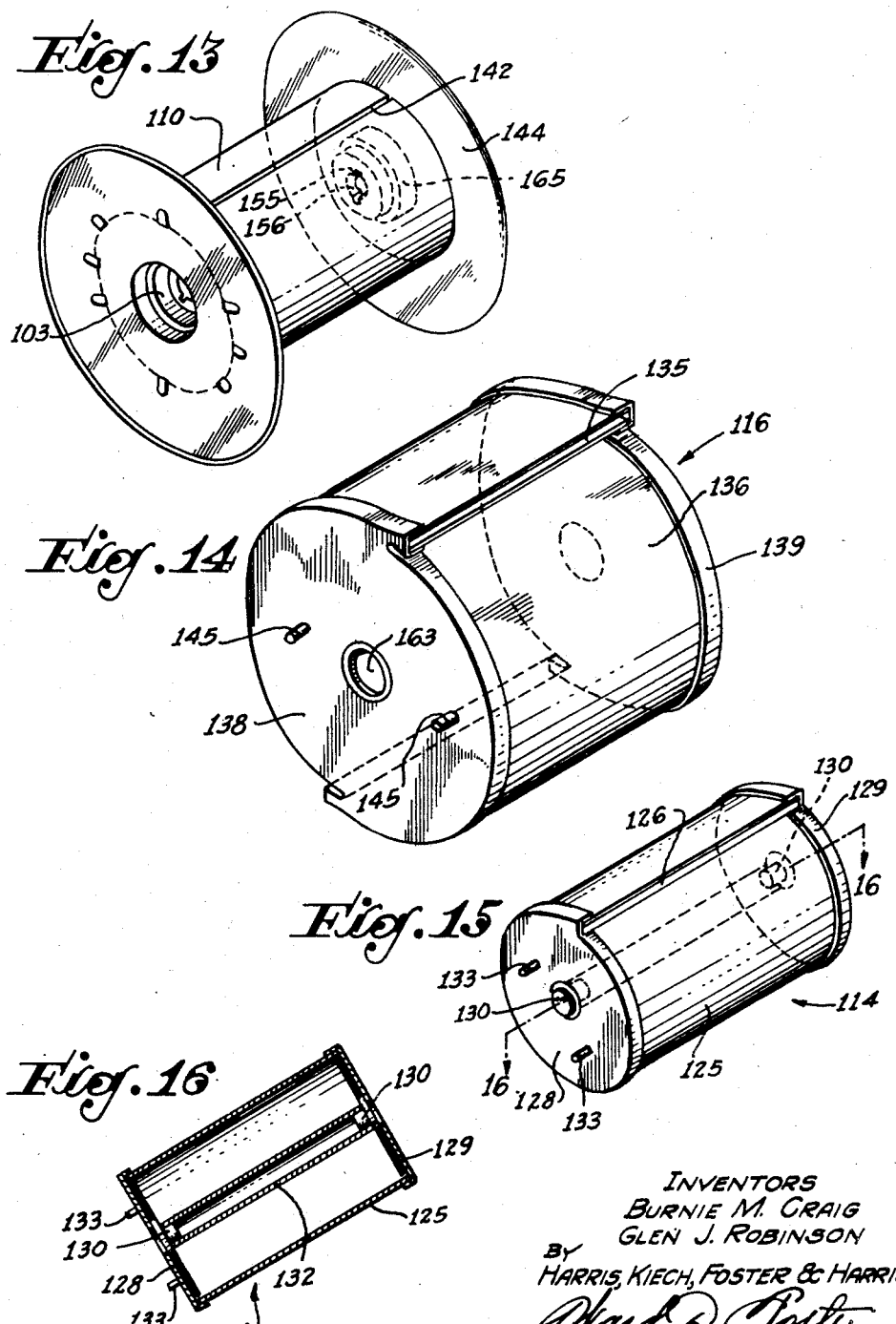

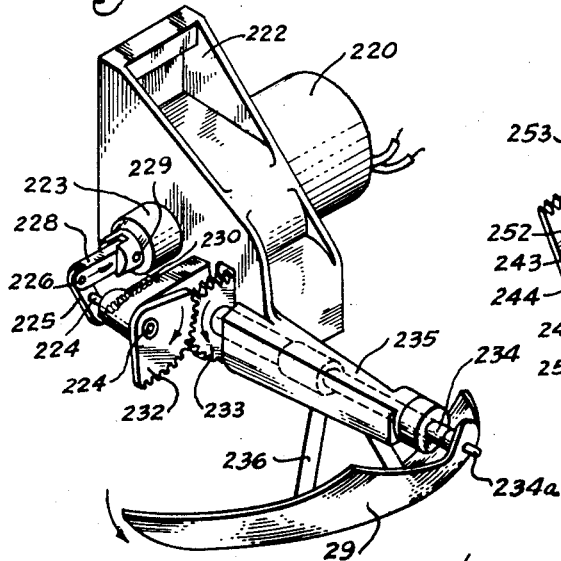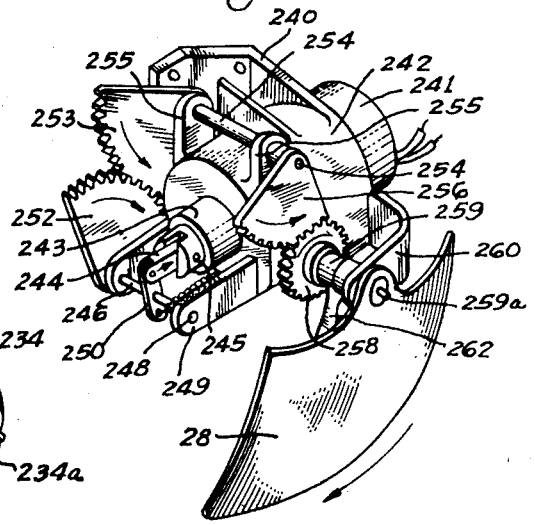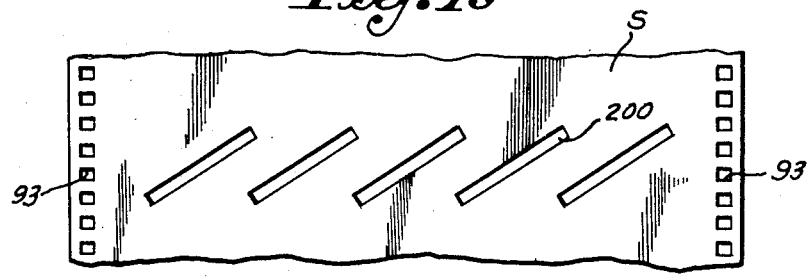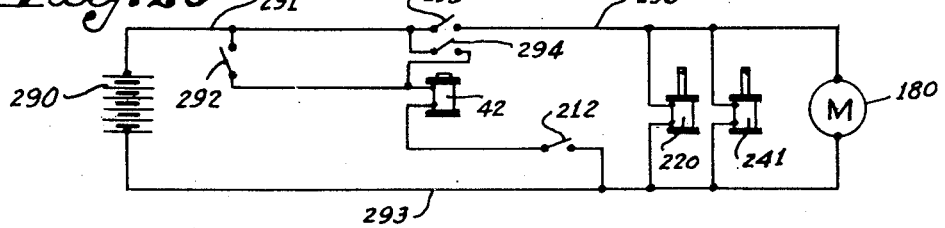

Patented June 20, 1950

2,512,486

UNITED STATES PATENT OFFICE 2,512,486

FORE-AND-AFT AERIAL CAMERA

Burnie M. Craig, Pasadena, and Glen J. Robinson, Glendale, Calif., assignors, by mesne assignments, to Fairchild Camera and Instrument Corporation, Jamaica, N. Y., and Pasadena, Calif., a corporation of Delaware Application September 26, 1944, Serial No. 555,816

20 Claims. (Cl. 88—18)

1

This invention relates to cameras and more particularly to cameras adapted for taking photographs from aeroplanes in flight.

A general object of the invention is to provide a camera structure adapted for taking photographs simultaneously fore and aft from an aeroplane, and a more specific object is to provide a camera construction and arrangement especially adapted for aerial photography on special missions, such as bombing missions, whereby photographs may be taken of targets and neighboring areas as they are approached, and simultaneously photographs may be taken of targets and neighboring areas which have been attacked and passed.

A further object of the invention is to provide means for automatically actuating film spools intermittently for the winding of exposed film and the presentation of unexposed film, and for automatically actuating shutter means for the taking of photographs during intervals when the film-winding means is stationary. A further object is to provide a camera structure wherein film-winding is intermittently actuated to advance film intermittently and shutter means is actuated continuously, the shutter means being adapted to effect exposures during intervals between film movements. A particular object in connection with the shutter actuation is to provide an endless focal-plane type of shutter with an exposure opening or openings occupying only limited portions of the length of the shutter, whereby an exposure opening passes between film and a camera lens only at spaced time intervals whereby to permit film actuation between said spaced intervals.

A further object and feature of the invention is to provide a structure which will permit the employment of a separate unexposed film container for each camera lens employed and a common exposed film container for receiving all of the exposed films. Another feature is to provide for ready insertion and removal of all the film containers, and latching means for retaining all of the containers in operating position.

A further object is to provide a novel and efficient construction of camera frame especially adapted for aerial use and designed to employ roll film and band shutter means, whereby the frame parts may be readily assembled and installed and in which roll film containers may be readily mounted and roll film may be readily threaded into operative position. Such an object applies especially in the use of plural lenses and individual film rolls therefor. According to another feature, the band shutter passes around the storage zone containing both the exposed and unexposed film, and to that extent encloses all the film. Also, this arrangement provides for travel of the band shutter in substantially the same plane as that portion of the film disposed in exposure position.

These objects are attained in general by a camera framework bolted or otherwise suitably mounted in a streamlined primary housing, such as one having a teardrop shape and adapted to be carried on the under side of an airplane part, the framework providing chambers to receive roll film containing and having means for supporting, actuating and guiding roll film and band shutter means past a plurality of lenses carried at opposite ends of the framework. Electrically actuated means, and electric circuits therefor, are provided to drive the film and shutter actuating means. In a preferred form, an endless band shutter of the focal-plane type is continuously driven whereby to effect exposure from all lenses during each cycle, while an intermittently operating drive including clutching and declutching means is employed to advance the film intermittently between cycles of operation.

Other objects and features of the invention will be apparent to those skilled in the art to which this invention pertains, upon reference to the following specification and accompanying drawings wherein one embodiment is disclosed for the purpose of illustration of the generic invention presented. In these drawings:

Fig. 1 is a longitudinal vertical section taken approximately on a median plane through the camera housing, the framework to which the lenses are connected and which supports the film, shutter and film-actuating and exposure mechanisms being removed to expose the inner wall of a cover used for retaining film containers;

Fig. 2 is a cross-sectional fragmentary detail taken on the line 2—2 of Fig. 1 and showing a portion of a latching mechanism for the cover;

Fig. 3 is a vertical transverse section taken approximately from the line 3—3 of Fig. 1, the shutter, the film and shutter-supporting frame and the actuating mechanisms being shown in place;

Fig. 4 is a vertical cross-sectional detail taken from the line 4—4 of Fig. 3, and showing the clutching and declutching mechanism for driving and releasing an exposed film spool normally housed in the exposed film container;

Fig. 5 is a longitudinal vertical section through the assembled mechanism, being taken approximately from the line 5—5 of Fig. 3;

Fig. 6 is a longitudinal vertical elevation of the outer wall of the main frame member of the supporting framework, as indicated by the lines 6—6 of Figs. 3 and 9, and showing especially the drive mechanisms for the shutter and film actuating devices;

Fig. 7 is a longitudinal, substantially horizontal section taken approximately from the line 7—7 of Fig. 6 and showing the drive mechanism for the exposed film spool;

Fig. 8 is a fragmentary horizontal section similar to that of Fig. 7 and taken from the line 8—8 of Fig. 6 to show the shutter drive mechanism;

Fig. 11 is principally a front elevation of the camera framework with the front cover plate removed, the view being taken approximately as indicated by the line 11—11 of Fig. 9, and looking in the opposite direction from the view of Fig. 6;

Fig. 12 is a fragmentary detail in perspective showing the arrangement of film-guiding rollers and their supporting means employed at one end of the supporting framework and also showing an opening which receives an element of the cover latching mechanism;

Fig. 13 is a perspective view of the spool which receives the exposed film;

Fig. 14 is a perspective view of the container which receives the exposed film spool and into which the exposed film is drawn during photographic operations;

Fig. 15 is a perspective view of one of the unexposed film containers from which unexposed film is drawn;

Fig. 16 is a longitudinal cross-section taken approximately as indicated by the line 16—16 of Fig. 15;

Fig. 17 is a perspective view of the closure and its actuating means for the aft end of the main housing;

Fig. 18 is a perspective view of the closure and its actuating means for the fore end of the main camera housing;

Fig. 19 is a fragmentary detail showing the slotted portion of the focal-plane shutter; and Fig. 20 is a wiring diagram of the circuits employed.

Figure 9:
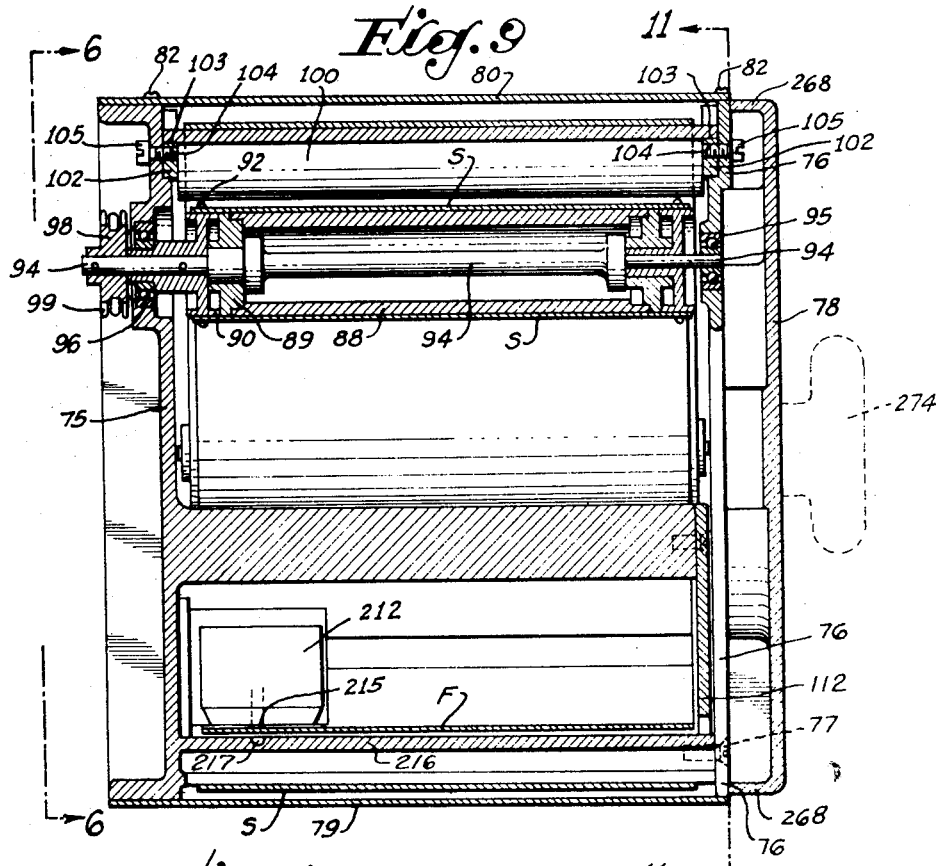
Fig. 9 is an enlarged transverse vertical section taken from the lines 9—9 of Figs. 5 and 11 and looking in the same direction as in Fig. 3, the shutter drive mechanism being shown in longitudinal section.

According to the embodiment of the invention shown in the drawings, a streamlined primary housing or casing 20 is provided which has an access door 21 adapted to be secured in place by any appropriate means 22.

Mounted within the main housing 20 is a secondary housing or framework carrying the various parts constituting the camera proper, as indicated in general at 23. The framework 23 carries at one end a forward lens structure generally indicated at 24, and at the opposite end a rear lens structure generally indicated at 25. The lens structures 24 and 25 are mounted upon the outer ends of hoods 26 which are secured to the opposite ends of the framework 23, so as to dispose the respective lens structures 24 and 25 at angles directed fore and aft, respectively, and slightly downward in line with doors or closures 28 and 29 respectively carried by the main housing 20.

The housing 20 comprises a main body member 30 in the form of a casting which may be provided with annular reinforcing webs 31, the casting 30 having an upwardly extending neck 32. Upon the neck 32 is mounted a top plate 33 preferably sealed by means of a gasket 34 and secured to the neck 32 by means of screws 35. For the purpose of mounting the housing 20 upon an under surface of an airplane a plurality of holes 36 is drilled through a flange portion 37 of the neck 32 and through the adjacent rim of the top plate 33. In order that electric cables 38 may be led into the housing 20 for the purpose of actuating the apparatus therein contained, a suitable connection 39 is provided in the top plate 33. These cables 38 are adapted to extend to various terminals 40 which are associated with a relay 42, the terminals 40 and the relay 42 being carried upon a relay board or platform 43 secured in any suitable manner to flanges 44 integral with the neck 32.

Figure 10:
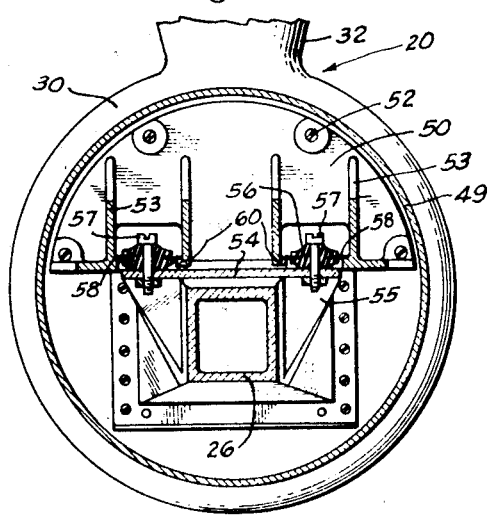
Fig. 10 is a cross-section taken on the line 10—10 of Fig. 1 and showing the suspension of one of the lens-carrying hoods which in turn carries the camera framework.

The casting which forms the body member 30 is provided at its opposite ends with bulkheads 45 which are in turn provided with relatively large openings 46 through which the lens-carrying hoods 26 project. Conveniently secured to the body member 30 adjacent the bulkheads 45 are forward and rearward shells 48 and 49 which respectively carry the fore and aft doors 28 and 29. Secured to the outward faces of the bulkheads 45, and within the shells 48 and 49 are bracket members 50 to which are in turn secured the hoods 26 whereby the hoods 26, being secured to the framework 23, support the framework 23 within the housing 20. These brackets 50 are secured to the bulkheads 45 by means of screws or bolts 52 and are provided with pairs of supporting webs 53 (Figs. 1 and 10) that are connected with carrier plates 54 integrally connected with the respective hoods 26 by means of integral webs 55. Each connection between the webs 53 and the plates 54 is through the medium of vibrational mountings which comprise rubber blocks 56 secured to the plates 54 by means of bolts 57, the rubber blocks 56 being circular and having annular metal rings 58 disposed therein, the outer edges of the rings 58 resting upon and engaging shoulders 60 projecting inwardly from the bases of each pair of webs 53. Obviously, any other suitable form of mounting capable of absorbing vibration that would be transmitted to the camera frame 23 may be used.

Mounted respectively on the shells 48 and 49 outwardly from the bulkheads 45 are forward and rearward lightproof diaphragms or bulkheads 62 and 63 which are provided with outwardly offset integral socket members 64 having apertures 65 which receive the lens mechanisms 24 and 25. Each lens mechanism 24 or 25 comprises a lens mounting 66 carrying a lens element 68 threaded into the outer end of the respective hood 26 in such manner that a portion of the lens mounting extends loosely through the respective aperture 65. In order to make a light seal at the loose joint between each socket 64 and the respective lens mounting 66, a cylindrical lightproof bellows 69 is disposed around the adjacent end of the hood 26 within the adjacent socket 64, one end of each bellows bearing against an annular flange 70 carried by the respective socket 64 and the other end of the bellows bearing against an annular flange 72 formed on the adjacent hood 26.

The camera framework 23 is provided with means for positioning and driving an endless focal-plane shutter S and two strips of film F, as seen variously in Figs. 3, 5, 7 and 9. The shutter S and film strips F, together with their guiding and supporting means are disposed between a main frame or main plate 75 and an opposite skeleton frame member 76 which is more in the form of a rim rather than a plate. The main frame member 75, which is preferably in the form of a casting, is provided, in the form shown with a plurality of integral spacing parts 75a, to the free ends of which the skeleton frame member 76 is secured in any desired manner, as by means of screws 77 (Fig. 11). Also forming a part of the main framework 23 is a cover plate 78 which is adapted to be disposed over the skeleton frame 76, as seen in Figs. 3 and 9. The framework 23 may be completed by means of a lower thin enclosing plate or skin 79 and a similar upper thin enclosing plate or skin 80 secured as by means of screws 82 (Fig. 9) to the main plate 75 and the skeleton plate 76.

For the purpose of positioning the endless band shutter S, each corner of the elongated framework 23 is provided with a shutter guide roller 85 journaled in bearings 86 (Fig. 6) carried both in the main plate 75 and in the skeleton plate 76. For the purpose of driving the band shutter S, a drive roller 88 is provided, as shown in Fig. 9, this roller 88 being mounted upon heads 89 which are secured to sprockets 90 having projecting drive teeth 92 to engage in apertures 93 (Fig. 19) at the edges of the band shutter S. The drive sprockets 90 are suitably fixed on a drive shaft 94, one end of which is journaled at 95 in the skeleton frame member 76, and the other end of which is journaled at 96 in the main frame plate 75, the extreme outer portion of the end of the shaft 94 which is journaled in the bearing 96 projecting beyond the outer wall of the frame member 75 and carrying a driven sprocket 98 actuated by a drive chain 99 (Figs. 6, 8, and 9). As seen in Figs. 5 and 9, the shutter S passes around the greater portion of the periphery of the drive roller 88, with the result that the drive sprockets 92 engaging in the apertures 93 of the shutter S readily accomplish shutter movement.

For the purpose of taking up slack in the shutter S and thereby properly tensioning the shutter S, and also for the purpose of properly guiding the shutter about the drive roller 88, an adjustable guide roller 100 (Figs. 5 and 9) is provided. This guide roller 100 is journaled at both ends in brackets 102 which have horizontally extending arms 103 mounted in sliding contact with the adjacent inner walls of the frame members 75 and 76 respectively. The frame members 75 and 76 have slots 104 which receive screws 105 that project through the slots and are threaded into the arms 103. Upon the loosening of screws 105, the arms 103 and the roller 100 are adjusted longitudinally to provide the proper tension in the shutter S, whereupon the screws 105 are tightened so that their heads bind upon the edges of the slots 104 and lock the arms 103 and the adjusting roller 100 in position.

As best seen in Figs. 5 and 7, the bases of the hoods 26, which are in the form of truncated pyramids, are secured as by flanges 107 and screws 108 to shoulders 109 of both of the frame members 75 and 76, in such relation that the shutter S passes between the adjacent guide rollers 85 along the focal-plane of the respective lens 68. Immediately behind the focal-plane at the base of each hood 26 is a laterally projecting back plate 110 which is an integral part of the casting forming the main plate 75.

At the upper and lower edges of both back plates 110, film guide rollers 112 are disposed for the purposes of receiving unexposed film F from unexposed-film containers 114 and carrying it along the outer faces of the respective back plates 110 and in the focal-plane of the respective lenses 68, the film thus moving immediately behind the endless band shutter S and in a path contiguous to the shutter path. In addition to the guide rollers 112 at the ends of the back plates 110, additional film guide rollers 115 are provided for the purpose of directing exposed film into an exposed film receiver or cassette 116. One end of each of the film guide rollers 112 and 115 is journaled in internal bearings 118 carried in the main frame plate 75 (Fig. 6), the opposite end of each roller 112 and 115 being journaled at 119 (Figs. 11 and 12) in the outer end of a corresponding irregularly shaped narrow face plate or bearing plate 120. Each face plate 120 is secured as by screws 122 to the adjacent outer end of the respective back plate 110, and also to the adjacent outer end of a corresponding complementary laterally projecting positioning wall 123 also integral with the main plate 75 (Figs. 5 and 12). By this arrangement, a unit, consisting of a face plate 120, a back plate 110 and a positioning wall 123 with the respective film guide rollers 112 and 115 mounted therein, is slightly spaced from adjacent portions of each end of the skeleton frame 76 and associated parts. These units are also spaced from each other to provide chambers for reception of the containers 114 and cassette 116.

The provision of the face plates 120 separate from the skeleton frame member 76 is required by the necessity of providing entrances for threading the film strips F laterally or edgewise into the instrument as the loaded unexposed film containers 114 and the exposed film cassette 116 are moved into place. Similarly, the configuration of the skeleton frame member 76 and the face plates 120 must be such as to permit introduction of the film containers 114 and the cassette 116.

As seen in Fig. 5, the unexposed film containers 114 are smaller than the exposed film cassette 116. This is occasioned by reason of employing the cassette 116 to receive exposed film from both of the containers 114. The unexposed film containers 114 have the construction shown in Figs. 15 and 16. They comprise outer shells 125 provided on one side with tangentially directed outlet slots 126. Each shell 125 is provided at one end with an end wall 128 and at the opposite end with a cover 129. The end wall 128 and the cover 129 are provided with bearings 130 adapted to receive a spool 132. Any suitable means, such as pins indicated at 133, may be employed for positioning one end of each container 114, this positioning means being such as to direct the outlet slot 126 toward an adjacent film guide roll 112. As film is drawn from each container 114, the respective spool 132 rotates on the bearings 130. Each film strip is threaded, as best seen in Fig. 5, so that the film is led from the respective container 114 to one of the guide rolls 112, thence across the face of the respective back wall 110 to the opposite guide roll 112, and thence over the respective guide roller 115 into an inlet slot 135 in a shell 136 forming a portion of the exposed film cassette 116, the shell 136 having two such slots 135 for the purpose of receiving the two film strips from the two containers 114. The shell 136 is provided at one end with a suitable end wall 138, and at the other end with a removable cover or closure 139. The closure 139 is removable for the reception of a spool 140 having two film-receiving slots 142 (Fig. 13) cooperating with retaining means such as narrow internally located strips 143 (Fig. 5). Upon rotation of the spool 140, the film strips F are wound upon the spool 140, the edges of the film being confined by conventional end walls 144. Similarly to the unexposed film containers 114, any suitable means, such as pins 145, may be provided on the end wall 138 to position the cassette 116 and prevent its rotation.

For the purpose of driving the exposed film spool 140, a transversely disposed drive shaft 150 is rotatably mounted in the main frame plate 75, one end of the shaft 150 extending through the plate 75 and carrying a drive disk 152, the inner portion of the shaft 150 extending entirely through the spool 140 and the cassette 116 and carrying a spline 154 which is exposed on both sides of the shaft 150 and is adapted to engage in short slots 155 at the opposite sides of an opening 156 in each end of the spool 140 through which opening the shaft 150 projects.

The driven end of shaft 150 is supported in the main plate 75 by means of an elongated ball bearing mounting 160 (Figs. 3 and 4) which is, in fact, a pair of spaced ball bearing units carried in a hub 162 bolted to the main plate 75. For the purpose of conveniently rotating the spool 140 within the cassette 116, the two ends 138 and 139 of the cassette are centrally provided with bearing sleeves 163 carrying ball bearing mountings 164 which engage within inwardly directed bosses 165 centrally provided in the end plates 144 of the spool 140 and having the slots 155 and openings 156.

The drive of the spool 140 is intermittent and is effected by a partial rotation of the disk 152 to and fro, as hereinafter described. The disk 152 is journaled upon the extreme outer end of the shaft 150 through the medium of a ball bearing mounting 166. At its periphery the disk 152 carries an annular flange 168 whose inner surface acts as a clutch face to engage a plurality of clutch balls 169 which work on inclined walls 170 formed by cutting elongated tapered notches 171 in the periphery of an annular flange 172 carried by a disk 173 which is secured to or is integral with the driven end of the shaft 150. The inner surface of the flange 172 in turn acts as a clutch face which cooperates with a series of clutch balls 174 working on inclined walls 175 formed by cutting tapered notches 176 in the periphery of the adjacent portion of the hub 162, the walls 175 being disposed oppositely with respect to the walls 171.

Thus, as the disk 152 is oscillated in the driving direction, the inner face of its annular flange 168 engages the balls 169 and forces them into driving engagement with the inclined walls 170 whereby to rotate the annular flange 172, the disk 173 and the shaft 150. During this motion the clutch balls 174 tend to be drawn along their inclined walls 175 out of clutching position. When the drive disk 152 is oscillated in the non-driving direction, the clutch balls 169 tend to be drawn out of clutching position, whereupon any tendency to rotate the annular flange 172 and its disk 173 in a non-driving direction is resisted by engagement of the inner driving face of the flange 172 with the clutch balls 174 to force them into contact with their inclined walls 175 in the hub 162. Since the hub 162 is stationary, the resultant action of the balls 174 is to brake the tendency of the flange 172 and disk 173 to rotate backwards.

The prime mover for the camera is a motor generally indicated at 180 (Figs. 5 and 6), which is located within the camera framework 23 adjacent the main frame plate 75. The motor shaft projects through the plate 75 and carries thereon a pinion gear 182 (Fig. 6) which engages a large drive gear 183. Fixed to the drive gear 183 is a smaller concentric gear 184 which meshes with a large film drive gear 185. As shown, the drive gear 185 is directly journaled at 186 on the main frame plate 75, and the large gear 183 is fixed on a stub shaft 188, the inner end of which is journaled at 189 in the frame plate 75 and the outer end of which is journaled at 190 in a removable plate 192.

For the purpose of driving the disk 152 and the exposed film spool 140, the film drive gear 185 has eccentrically pivoted to its outer face at 194 a reciprocating drive rod 195 whose opposite end is eccentrically pivoted at 196 adjacent the periphery of the film drive disk 152. Thus, as the motor 180, operating through the gear train 182, 183, 184 and 185 rotates the pivot 194, the connecting rod 195 causes merely an oscillation of the disk 152. This movement is effected by reason of the fact that the radius between the center of rotation of the gear 185 and the pivot 194 for the rod 195 is appreciably less than the radius between the center of rotation of the film drive disk 152 and its pivotal connection 196, the pivot 196 thus never rising to the center of rotation of the disk 152. Therefore, continuous rotation of the motor 180 and the film drive gear 185 is converted into oscillating motion of the film drive disk 152 with consequent intermittent forward drive of the exposed film spool 140, due to the clutching and braking action of the clutch balls 169 and 174 and associated parts cooperating with the hub 162.

While the film strips F are driven only intermittently in order to provide intervals during which film exposure may take place, the endless focal-plane shutter S, which contains but a single row of transverse exposure slots 200 (Fig. 19), is continuously driven, the movement of the film occurring during the interval when the exposure slots travel across the top of the camera framework 23, as seen in Fig. 5. The continuous drive of the shutter S is effected through the medium of the large gear 183, which meshes with a small driven gear 202 fixed on a stub shaft 203, one end of which is journaled at 204 in the frame plate 75 and the other end of which is journaled at 205 in the removable plate 192. Also fixed upon the stub shaft 203 is a sprocket 206 over which passes the chain 99 engaging the sprocket 98 fixed on the outer end of the drive shaft 94 of the shutter drive roll 88, as best seen in Figs. 8 and 9.

In this manner the shutter drive roll 88 is continuously rotated, so that the exposure slots 200 continuously travel entirely around the camera framework 23 over the guide rollers 85 and the tensioning roller 100. The timing of the gear train 182, 183 and 185 is such that, as has been indicated, the exposure slots 200 pass from adjacent the top of the base of one of the hoods 26 to the top of the base of the other hood 26 during the interval that the film-winding mechanism is operating to bring unexposed film into the focal-plane. The interval between film winding movements of the exposed-film spool 140 is of sufficient duration for the exposure slots 200 to pass behind both of the lenses 68, so that both forward and rearward exposures are made in a single cycle, that is between film movements.

As is shown in Fig. 19, instead of having a single slot extending continuously across the shutter band S, a plurality of the slots 200 is employed, these slots being disposed diagonally, as shown, in order to provide strips of fabric between them whereby to reinforce the band. In order to provide uniform illumination, corners of adjacent slots overlap in order that the corner of one slot which overlaps the path of travel of the adjacent slot will pass enough additional light to provide exposure equal to that passing through intermediate portions of a slot.

Electrical energy is supplied to the motor 180 by means of an electric cable 210 (Fig. 6) which is initially energized from any suitable control station. Inasmuch as the motor 180 is intended to operate until all film in the two containers 114 has been exposed, it is desirable to provide means for automatically cutting off the current when all film has been run through the apparatus. For this purpose an automatic film switch 212 is provided to which leads a branch line 214. The film switch 212 includes a control in the form of a finger or feeler 215 (Figs. 5 and 9) which holds the switch in circuit-closing position so long as film passes between the finger 215 and a film positioning foot 216. However, when all of the film has been wound into the cassette 116 so that there is nothing to hold the feeler 215 in elevated position, the feeler 215 drops down into a recess 217 in the foot 216 thereby breaking the electric circuit to the motor 180 and stopping the mechanism.

For the purpose of automatically opening and closing the closures 28 and 29 carried by the shells 48 and 49 at the forward and rearward ends of the main housing 20, solenoid actuated mechanisms are employed, as shown in Figs. 17 and 18. Since the instrument is to be carried externally of an airplane, and creates the usual wind resistance, the housing 20 is streamlined to a teardrop configuration in order to reduce wind resistance as much as possible. As a result, the forward end carrying the closure 28 is shaped differently from the rearward end, and, therefore, its closure operating mechanism is differently designed from that employed for operating the rearward closure 29, it being convenient, if not necessary, to support the closure mechanisms primarily from the light-tight bulkheads 62 and 63 in which the two lens mountings 24 and 25 are positioned.

As shown in Fig. 17, the mechanism for operating the rearward closure 29 comprises a solenoid 220 which is carried by a suitably shaped bracket 222 secured to the rear diaphragm 63 above the lens mounting 25. The solenoid 220 receives a solenoid core 223 about which is disposed a conventional solenoid winding (not shown). When the solenoid is energized, the core 223 is retracted in the direction of the arrow, thereby swinging a rock shaft 224 through the medium of a link 225 which is pivoted at 226 to the end of an actuating link 228 pivoted at 229 to the core 223. This movement of the rock shaft 224 takes place against the tension of a spring 230, which tends to return the parts to normal position when the solenoid winding is de-energized. Upon rotation of the rock shaft 224, a sector gear 232 secured thereto rotates a gear 233 which is fixed to a shaft 234 journaled in a rearwardly projecting bracket 235 (Figs. 1 and 17). A forward portion of the closure 29 is secured to the shaft 234 through the medium of an arm 236 fixedly secured both to the closure 29 and to the shaft 234. The rearward end of the closure 29 is secured to a reduced extremity 234a of the shaft 234 which reduced extremity also serves as a bearing to center the adjacent parts by reason of its mounting in the extreme rearward end of the shell 49.

To accommodate the space in the shell 48 at the forward end of the housing 20, a bracket 240 is secured to the diaphragm 62 and carries a solenoid 241 in a housing 242 from which projects a solenoid core 243. Here, the closure 28 is moved by retracting the solenoid core 243. For this purpose, a link 244 pivoted at 245 to the core 243 is connected to a link 246 secured to a rock arm 248 having its opposite ends mounted in arms 249. When the solenoid is energized, the link 244 is retracted against the tension of a spring 250 and rocks a sector gear 252 engaged with a sector gear 253 to rock a second rock arm 254 which is journaled in ears 255 carried by the solenoid housing 242. The rock arm 254 carries a sector gear 256 meshing with a pinion gear 258 which is fixed on a shaft 259 whose inner end is journaled in the solenoid housing 242 and whose outer end is journaled in an arm 260 projecting from the solenoid housing 242. The closure 28 is secured to an arm 262 which is in turn fixed upon the shaft 259, the closure 28 having a portion also fixed to a reduced extremity 259a of the shaft 259, the extremity 259a being journaled in the adjacent forward portion of the shell 48.

With the construction shown in Figs. 17 and 18, the solenoids 220 and 241 are energized when electric current is supplied to the motor 180, these cores being then retracted to swing the closures 28 and 29 laterally out of the path of the lenses 68. As long as the motor 180 operates, the solenoids remain energized and the closures 28 and 29 remain open. When the film runs through the switch 212 and the feeler 215 drops down to open the switch 212, the current to the entire mechanism is interrupted with the result that the motor 180 stops and the solenoids 220 and 241 are de-energized, whereupon the closures 28 and 29 return to their closed positions under the influence of their respective springs 250 and 230 and the influence of gravity.

When the camera is ready for use, the two film containers 114 and the exposed film cassette 116 carrying two strips of film F are in the position shown in Fig. 5, and the containers 114 and the cassette 116 are held against rotation, as by the means above indicated or any other suitable means. Also these containers 114 and the cassette 116 are held against longitudinal motion by reason of engagement of their outer ends with offset partially circular projections or flanges extending inward from the inner face of the cover plate 78, there being two relatively small curved projections or flanges 265 (Fig. 1) to engage the ends of the unexposed film containers 114 and a pair of opposing curved projections 266 formed on the arc of a larger circle for engaging the end of the cassette 116. The cover plate 78 is also provided with a peripheral flange 268 which engages around the edge of the assembled framework 23 when the parts are in closed relationship. For the purpose of retaining the cover plate 78 in closed position, a pair of latching bars 270 is provided whose ends extend through openings 272 in the curved projections 266 (Figs. 1 and 3), the extremities of these bars 270 being adapted to enter openings 273 formed in adjacent portions of the walls 123 behind the adjacent face plates 120, as illustrated in Fig. 12. The bars 270 are adapted to be moved to and from latching position through the medium of a knob 274 (Figs. 2 and 3) on the outer face of the cover plate 78, the knob 274 having a shaft 275 journaled in the cover plate 78, and projecting therethrough and having fixed thereupon an actuating lever 276 to which the latching bars 270 are pivoted at 277. Inasmuch as the bars 270 are offset from the center of rotation of the knob 274, movement of the knob causes the extremities of the bars to be moved into the openings 273 or to be withdrawn therefrom. Secured to the middle portion of the lever 276 is a laterally projecting arm 278 (Fig. 1) aligned with the center of rotation of the knob 274 and the lever 276. Secured to the outer end of the arm 278 is one end of a contraction spring 280 whose other end is secured at 282 on the inner side of the cover plate 78, across center from the arm 278, whereby to assume off center positions as the arm 278 swings. Thus, as the knob 274 is rotated, the latch bars 270 are moved into and out of engagement with the openings 273, the spring 280 snapping the arm 278 past dead center in either latching or unlatching position, lugs 284 being provided to limit the movement.

In Fig. 20 there is shown a wiring diagram of the electric controls for operating the camera. Here, a source of current 290, such as a battery or generator in an airplane, is connected by a line 291 with a starting switch 292 which leads through the relay 42 carried on the relay board 43 (Fig. 1) and thence to the film switch 212 (Figs. 5 and 6). The circuit is completed through a return line 293. When the relay 42 is energized, a relay switch 294 and a main line switch 295 are closed by the relay 42, with the result that a circuit is completed by way of a line 296 through the solenoids 220 and 241 and through the motor 180. Thereupon, the starting switch 292 may be opened, the relay control switches 294 and 295 maintaining the circuits. However, when the film switch 212 is opened by winding all of the film into the cassette 116, the relay 42 is de-energized thereby opening the switch 295 and thus de-energizing the solenoids 220 and 241 and the motor 180, whereupon the entire mechanism ceases to operate.

Operation

In preparing to use the camera of the present invention, assuming the device to be in inoperative assembled condition, as indicated in Fig. 3 for example, the access door 21 is removed and the cover plate 78 is removed by rotating the knob 274 to withdraw the latch bars 270 (Figs. 1, 2 and 3) from the openings 273 (Fig. 12). This exposes the outer ends of the unexposed film containers 114 and the exposed film cassette 116, the positions of which are indicated in Fig. 11. The containers 114 and cassette 116 are then withdrawn, the covers 129 and 139 removed, and fresh rolls of film F loaded into the containers 114 in a dark room in the usual manner. The ends of the film strips F are then passed into the retaining slots 142 of the exposed film spool 140, the respective film lying in the inlet slots 135, whereupon the cover 139 of the cassette 116 is replaced. With sufficient lengths of film being withdrawn for the purpose, the containers 114 and the cassette 116 are then presented to the positions indicated in Fig. 11, and the withdrawn film ends are then properly looped and inserted into the passages provided between the face plates or bearing plates 120 and the adjacent portions of the skeleton frame member 76. As the containers 114 and the cassette 116, together with looped film, are moved into position, the film strips are moved into place around the film guide rollers 112 and 115, one of the film strips being directed under the switch controlling finger 215 of the film switch 212.

Upon completion of the installation of the film containers 114 and the cassette 116, together with the threading of the film about the rollers 112 and 115, the cover 78 is returned to its operative position, as seen in Figs. 3 and 9, and the knob 274 is turned to project the extremities of the latch bars 279 into the openings 273 (Fig. 12) in the projecting film positioning members 123. Upon replacing the access door 21, the apparatus is ready for use, assuming that it has been properly installed in a depending relation upon a portion of an airplane by means of screws passed through the supporting openings 36 in the upper end of the neck 32 (Fig. 1). The electric conduits 38 (Fig. 1), having been properly connected, the camera is ready for operation upon the closing of the starting switch 292, as shown in the wiring diagram of Fig. 20.

When the operator wishes to take aerial photographs, the starting switch 292 is closed, and, since the film switch 212 was closed by lifting of the finger 215 (Fig. 5) when the film was installed, the relay 42 is energized, thereby closing the relay switch 294 and the main line switch 295. As a result electric current is passed through the motor 180 and through the solenoids 220 and 241. The operator may then open the switch 292, the solenoids 220 and 241 and the motor 180 continuing to function by reason of the fact that the relay 42 maintains the switches 294 and 295 closed and the flow of curent through the relay switch 294 and the film switch 212 keeps the relay 42 energized.

When the solenoids 220 and 241 are energized, they open the fore and aft closures 28 and 29 (Fig. 1), thereby exposing to the lenses 68 the views toward which the lenses are directed.

Meanwhile the motor 180 (Figs. 5 and 6) has begun to drive the endless band shutter S through the medium of the gear train 182, 183 and 202, by way of the sprocket 206, the chain 99, the sprocket 98, the drive shaft 94 and the shutter drive roller 88 carrying the shutter drive teeth 92 (Figs. 6 to 9). This drive causes the shutter S (Fig. 5) to be driven continuously whereby to advance the exposure slots 200 (Fig. 19) intermittently behind the respective lenses 68 and the focal-planes thereof. At the same time, the large gear 183, through the medium of its concentric small gear 184, continuously drives the film drive gear 185 which in turn causes reciprocation of the connecting rod 195 through the medium of the pivot connection 194 (Figs. 6 and 7) whereby the pivot connection 196 causes the disk 152 to oscillate, with the result that the clutch mechanism shown in Fig. 4, which cooperates with the disk 152, drives the exposed film spool 140 intermittently as the connecting rod 195 oscillates the disk 152 in one direction. Each intermittent movement of the exposed film spool 140 winds film from each of the film containers 114 onto the spool 140 in sufficient amount to advance exposed film out of the focal-planes of the lenses 68 and bring unexposed film into position in the said focal-planes and closely adjacent the shutter S. The rate of travel of the endless band shutter S, and the location of the exposure slots 200 therein with respect to the movements of the film winding drum 140, is such that the slots 200 move across the top of the framework 23 from one shutter guide roller 85 to the opposite guide roller 85 during the interval that the exposed film spool 140 is being rotated. When the spool 140 ceases rotation, the slots 200 then pass across the focal-plane of one of the lenses 68, thereby exposing adjacent film guided by the respective back wall 110, thence across the bottom of the apparatus and around the lower shutter guide rolls 85, and thence upward adjacent the focal-plane of the other lens 68 to expose film positioned adjacent the corresponding back wall 110. When the exposure slots 200 have completed the second exposure and start along their uppermost traverse of the apparatus, the exposed film drum 140 is again partially rotated to bring unexposed portions of film into position.

As long as there is a supply of unexposed film the apparatus operates continuously and takes a series of pictures upon the forward film and another series of pictures upon the rearward film. This operation continues until the film which travels under the finger 215 in the film switch 212 is exhausted, whereupon the finger 215 drops down and opens the switch 212. Thereupon, the circuit through the relay 42 (Fig. 20) is broken, by reason of the opening of the switch 212, and the relay 42 acts to open the main line switch 295 whereupon current to the motor 180 and to the solenoids 220 and 241 is interrupted. As a result, the motor 180 ceases to operate, with consequent cessation of operation of the shutter and film drive mechanism, and at the same time the de-energization of the solenoids 220 and 241 permits the springs 230 and 250 (Figs. 17 and 18) to return the fore and aft closures 28 and 29 to closed position whereby to protect the lenses 68.

The operation having ceased, all film will have been exposed and wound upon the exposed film spool 140, each film strip F being wound continuously within the other film strip. Upon termination of the flight, the access door 21 is removed, the cover plate 78 is removed, and the exposed film cassette 116 is withdrawn and sent to the developing room.

We claim as our invention:

1. In combination in a camera: a housing; independent fore and aft exposure lenses carried at opposite ends of said housing for taking separate pictures from said opposite lenses; separate means to supply separate, unexposed film to each lens; common means to take up exposed film from both lenses; means to drive said take-up means intermittently; and endless band shutter means adapted to cooperate with said lenses to expose film intermittently through each lens and having an opening located to move past each of said lenses between movements of said film take-up means, said endless band shutter being disposed around said separate film supply means and said take-up means.

2. In combination in a camera: a rotary film carrier for receiving exposed film; film guide means adapted to direct film past a lens and to said carrier; an endless band shutter having exposure means adapted to be moved through an exposure position with respect to a lens to expose adjacent film; continuously rotatable gear drive means connected to move said shutter continuously; oscillating means to drive said carrier; a lost motion connection between said carrier and said oscillating means whereby to drive said carrier intermittently and in one direction only; and a pitman between said gear means and said oscillating means to drive the latter from said gear means, one end of said pitman being attached to said gear means to travel in a circle on a relatively short radius and the other end of said pitman being attached to said oscillating means to move on a relatively larger radius and thereby oscillate as said one end revolves about its center.

3. In combination in a camera: frame means having a seat adapted to receive a film container in non-rotatable relation; a film container mounted in said seat and having film inlet passage means; a photographic film-receiving carrier in said container; driving and supporting means carried by said frame means and projecting into said container and engaging said carrier in driving and supporting relation; a second container non-rotatably supported in a seat in said frame means and having a film outlet passage; a film spool rotatably carried in said second container; a third container non-rotatably supported in a seat in said frame means and having a film outlet passage; a film spool rotatably carried in said third container; means to guide film between said containers, said guide means being disposed to direct film from the outlet passages of said second and third containers to the inlet passage of the first mentioned container and its film-receiving carrier; and means adapted for photographically exposing said film.

4. In combination in a camera: frame means having opposite sides and having a seat to receive a film container in non-rotatable relation; a film container mounted in said seat and having film inlet passage means; a photographic film-receiving carrier in said container; driving and supporting means carried by said frame means and projecting into said container and engaging said carrier in driving and supporting relationship, said driving and supporting means including a spindle extending through and supporting both ends of said film-receiving carrier; and bearings for said spindle and disposed in said opposite sides of said frame means, the side carrying one of said bearings and such one bearing being axially removable from the respective end of said spindle.

5. A combination according to claim 4 including: a second container non-rotatably supported in a seat in said frame means and having a film outlet passage; a third container non-rotatably supported in a seat in said frame means and having a film outlet passage; film spools rotatably carried in said second and third containers; and means disposed to guide film from said second and third containers to the film inlet passage means of the first mentioned container and to its film-receiving carrier.

6. In combination in a camera: a main wall carrying laterally projecting mountings for exposed and unexposed film containers; frame means connected with and disposed opposite said main wall and having passageways therethrough opposite said main wall for the movement of said containers to and from mounted position; an endless band shutter mounted between said main wall and said frame means; guide rollers for said band shutter journalled at their opposite ends in said main wall and said frame means; and a cover plate for said frame means to close said passageways and retain said containers in mounted position.

7. In combintion in a camera: a housing having a main wall; mounting means projecting laterally from said main wall for mounting thereon and supporting containers for exposed and unexposed film; frame means disposed opposite said main wall, and having openings provided opposite said mounting means through which openings and containers may be passed to and from said mountings; guide rollers having their opposite ends journaled respectively in said main wall and said frame means; and a cover plate adapted to be removably mounted upon said housing to cover said openings and frame means.

8. A combination as in claim 7 wherein an endless band shutter is mounted between said main wall and said frame means, said band shutter being mounted upon certain of said guide rollers.

9. A combination as in claim 8 wherein others of said guide rollers are adapted to receive and guide film from said containers.

10. A combination as in claim 7 wherein lens-supporting means are provided upon the opposed ends of said main wall and said frame means respectively, and a focal-plane back plate projects laterally from said main wall between said containers and the focal plane of a lens on said lens-supporting means.

11. In combination in a camera frame: a main frame member; skeleton frame means having openings for the reception of a length of photographic film and film containers; spacing means secured between said frame member and frame means and spacing them apart; means secured to said main frame member and projecting toward openings in said skeleton frame means, said projecting means and said spacing means being spaced from each other to provide film passages, and said spacing means and projecting means providing spaces between them for reception of film containers; and film guide means carried in said projecting means.

12. A combination according to claim 11 wherein said projecting means provides a guide plate at a focal-plane in said camera frame.

13. A combination according to claim 11 wherein said film guide means in said projecting means are guide rollers journaled at one end adjacent the mounting of said projecting means on said main frame member, and said frame means includes bearing plate means secured to the outer end of said projecting means, the other ends of said rollers being journaled in said bearing plate means.

14. A combination according to claim 11 wherein guide rollers for a band shutter are mounted between said frame members.

15. A combination as in claim 11 wherein said projecting means are adapted to support said film containers and are unattached to said skeleton frame means.

16. In combination in a camera frame: an elongated main frame member; an elongated skeleton frame member having an opening for the passage of photographic film and film containers; spacing means secured between said frame members and spacing them apart; lens supporting means at an end of said frame members; roller guide means disposed between and around the periphery of said frame members and adapted to carry a band shutter; film-positioning projecting means secured to each end of said main frame member and projecting toward openings in said skeleton frame member, said projecting means and said spacing means being spaced from each other to provide film passages, and said spacing means and projecting means providing spaces for reception of film containers; and film guide rollers carried in said projecting means.

17. A combination according to claim 16 wherein the film-positioning projecting means includes a back wall disposed at the focal-plane adjacent said lens-supporting means.

18. A combination according to claim 16 wherein a back wall is carried between said frame members at the focal-plane of said lens-supporting means, and film guide means is disposed at opposite ends of said back wall to lead photographic film along said back wall and in said focal-plane.

19. A combination according to claim 16 wherein a back wall is provided between said frame members at the focal-plane of said lens-supporting means, said guide means including means disposed adjacent the end of said back wall to guide said band shutter forward and adjacent to said back wall, and certain of said film guide rollers being disposed adjacent said ends of said back wall to guide photographic film along said focal-plane.

20. A combination according to claim 16 including means adapted for intermittently driving film-containing means carried by said frame and means adapted to drive a band shutter continuously.

BURNIE M. CRAIG.
GLEN J. ROBINSON.

REFERENCES CITED

The following references are of record in the file of this patent:

UNITED STATES PATENTS

| Number | Name | Date |
|---|---|---|
| 349,133 | Anthony et al. | Sept. 14, 1886 |
| 858,146 | Borsum | June 25, 1907 |
| 1,087,083 | Debrie | Feb. 10, 1914 |
| 1,319,698 | De Brayer | Oct. 28, 1919 |
| 1,358,919 | Arnold | Nov. 16, 1920 |
| 1,414,942 | Gill | May 2, 1922 |
| 1,423,364 | Sharpe | July 18, 1922 |
| 1,686,650 | Chanier | Oct. 9, 1928 |
| 1,831,794 | Adams | Nov. 10, 1931 |
| 1,866,585 | Tenny | July 12, 1932 |
| 1,896,732 | Stone | Feb. 7, 1933 |
| 1,973,477 | Fritts | Sept. 11, 1934 |
| 2,020,384 | Stone | Nov. 12, 1935 |
| 2,061,177 | Tasker | Nov. 17, 1936 |
| 2,202,138 | Buckham | May 28, 1940 |
| 2,245,606 | Rauch | June 17, 1941 |
| 2,317,096 | Dunn | Apr. 20, 1943 |
| 2,351,999 | Nervin | June 20, 1943 |
| 2,338,657 | Mihalyi | Jan. 4, 1944 |

FOREIGN PATENTS

| Number | Country | Date |
|---|---|---|
| 886 | Great Britain | of 1897 |
| 13,128 | Great Britain | of 1908 |
| 509,133 | France | Nov. 2, 1920 |
| 409,823 | Germany | Feb. 13, 1925 |
| 685,807 | France | Apr. 7, 1930 |
| 286,834 | Italy | June 24, 1931 |
| 562,772 | Germany | Oct. 28, 1932 |
| 488,497 | Great Britain | July 7, 1938 |
| 499,378 | Great Britain | Jan. 20, 1939 |

Certificate of Correction

Patent No. 2,512,486 June 20, 1950

BURNIE M. CRAIG ET AL.

It is hereby certified that error appears in the printed specification of the above numbered patent requiring correction as follows:

Column 1, line 24, after the word "film-winding" insert *means*; column 2, line 5, for "containing" read *containers*; column 12, line 22, for "latch bars 279" read *latch bars 270*; column 15, line 14, for "and" read *said*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Pat*